US007059818B2

(12) United States Patent
Kepplinger et al.

(10) Patent No.: US 7,059,818 B2
(45) Date of Patent: Jun. 13, 2006

(54) METHOD AND DEVICE FOR DISTRIBUTING A LUMPY BULK MATERIAL

(75) Inventors: Leopold Werner Kepplinger, Leonding (AT); Johann Wurm, Bad Zell (AT); Franz Berner, Asten (AT)

(73) Assignee: Voest-Alpine Industrieanlagenbau GmbH & Co. (AT)

( * ) Notice: Subject to any disclaimer, the term of this patent is extended or adjusted under 35 U.S.C. 154(b) by 0 days.

(21) Appl. No.: 10/380,941

(22) PCT Filed: Aug. 27, 2001

(86) PCT No.: PCT/EP01/09852

§ 371 (c)(1),
(2), (4) Date: Jun. 23, 2003

(87) PCT Pub. No.: WO02/27041

PCT Pub. Date: Apr. 4, 2002

(65) Prior Publication Data

US 2004/0022621 A1 Feb. 5, 2004

(30) Foreign Application Priority Data

Sep. 22, 2000 (AT) ............................ A 1612/2000

(51) Int. Cl.
*B65G 11/00* (2006.01)

(52) U.S. Cl. ...................................... 414/299; 414/808

(58) Field of Classification Search ................ 414/162, 414/205–207, 299–302, 804, 808; 193/46, 193/2 R, 27, 32–34
See application file for complete search history.

(56) References Cited

U.S. PATENT DOCUMENTS 2,646,407 A * 7/1953 Lassiat et al. ................ 502/47
2,837,194 A * 6/1958 Ross ........................... 193/32
4,029,220 A * 6/1977 Greaves ...................... 414/206
4,040,529 A * 8/1977 Wurdeman et al. ......... 414/301
4,040,530 A * 8/1977 Mahr et al. ................. 414/206

(Continued)

FOREIGN PATENT DOCUMENTS

DE 29515419 11/1995

(Continued)

OTHER PUBLICATIONS

International Search Report.

*Primary Examiner*—James W. Keenan
(74) *Attorney, Agent, or Firm*—Ostrolenk, Faber, Gerb & Soffen, LLP

(57) ABSTRACT

The invention relates to an apparatus and a process for distributing a lumpy bulk material, in particular iron ore which has been at least partially prereduced, onto an extensive surface, in particular onto a fixed bed, this surface extending within a reactor or vessel used in physical or chemical process technology, in particular in a reactor used in a metallurgical plant to produce pig iron or primary steel products, and the lumpy bulk material being charged via at least one charging apparatus, which has at least two, in particular rotationally symmetrical, chutes, which are preferably arranged at the same distance from the vertical longitudinal axis of the reactor. In this arrangement, at least a proportion of the bulk material, in particular after it has been introduced into the chute, before it comes into contact with the extensive surface, is distributed in the radial and/or tangential direction—as seen from above—at a scattering device which is assigned to at least one of the chutes and is preferably in the chute.

15 Claims, 4 Drawing Sheets

U.S. PATENT DOCUMENTS

Figure 1:
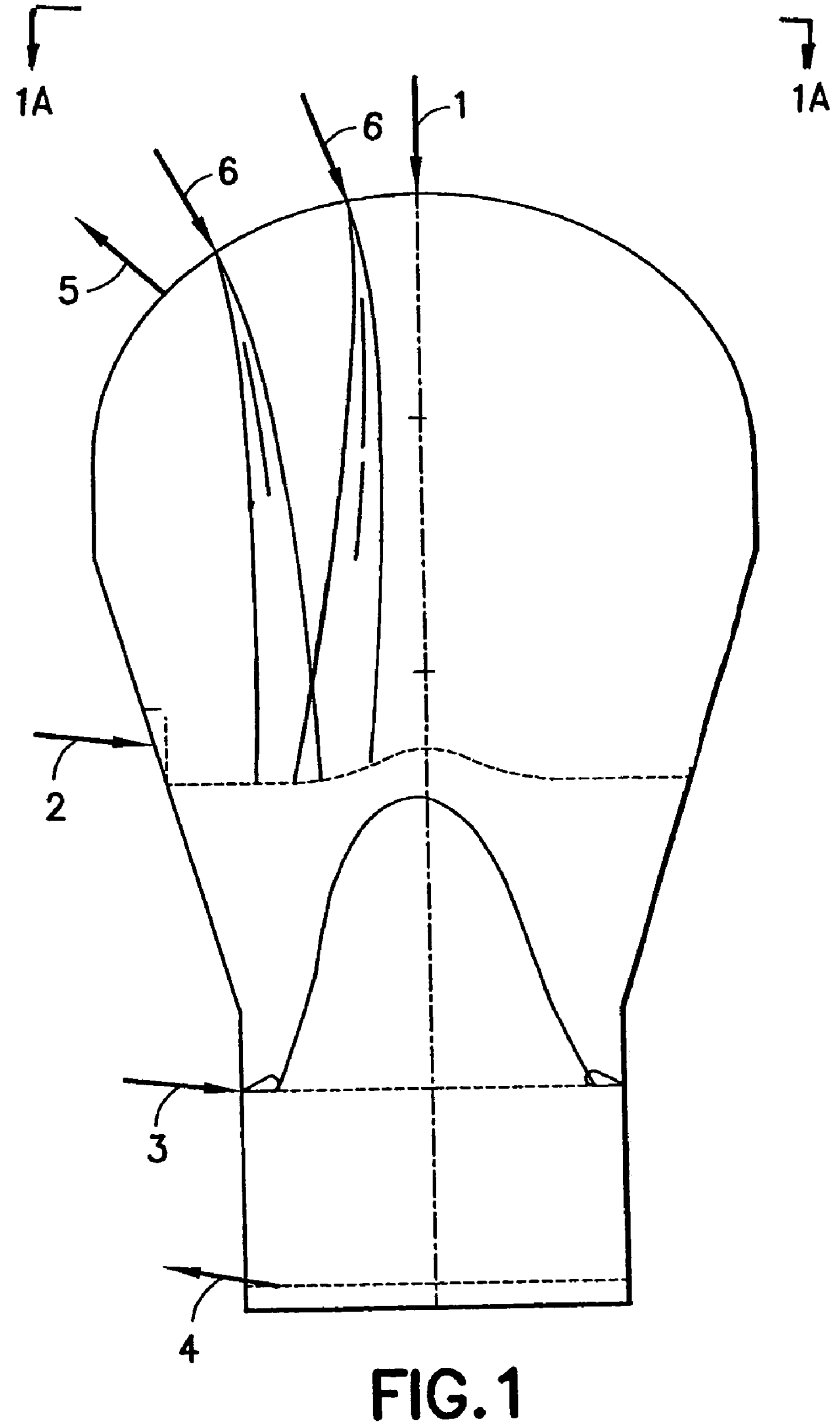

| | | | | | |
|---|---|---|---|---|---|
| 4,243,351 | A | | 1/1981 | Legille et al. | 414/206 |
| 4,478,300 | A | * | 10/1984 | Mikami | 177/59 |
| 4,497,609 | A | | 2/1985 | Santén | 414/786 |
| 4,547,985 | A | * | 10/1985 | Silins et al. | 37/118 R |
| 5,022,806 | A | * | 6/1991 | Lonardi et al. | 414/208 |
| 5,836,362 | A | * | 11/1998 | Ackley et al. | 141/286 |
| 6,443,193 | B1 | * | 9/2002 | Blasco | 141/286 |
| 6,471,029 | B1 | * | 10/2002 | Pierce | 193/14 |

FOREIGN PATENT DOCUMENTS

| | | | |
|---|---|---|---|
| DE | 19929180 | | 1/2001 |
| FR | 1197358 | | 11/1959 |
| FR | 1266362 | | 7/1961 |
| FR | 1367391 | | 7/1964 |
| JP | 59104406 | | 6/1984 |
| KR | 2004047164 | * | 6/2004 |
| WO | WO 00/43304 | * | 7/2000 |

* cited by examiner

METHOD AND DEVICE FOR DISTRIBUTING A LUMPY BULK MATERIAL

The invention relates to an apparatus and a process for distributing a lumpy bulk material, in particular iron ore which has been at least partially prereduced, onto an extensive surface, in particular onto a fixed bed, this surface extending within a reactor or vessel used in physical or chemical process technology, in particular in a reactor used in a metallurgical plant to produce pig iron or primary steel products, and the lumpy bulk material being charged via at least one charging apparatus, which has at least two, in particular rotationally symmetrical, chutes, which are preferably arranged at the same distance from the vertical longitudinal axis of the reactor.

The invention also relates to new types of scattering devices.

The distribution of a lumpy bulk material on an extensive surface represents a problem which is known in plant construction and in process engineering. Particularly in the case of reactors used in chemical/physical process engineering, considerable efforts are being made to achieve a degree of distribution of the bulk material which is optimized for the particular process. Incorrect loading of a reactor of this type may lead to a reduction in the quality of the product produced and also to a significantly higher level of environmental pollution, for example caused by higher dust emissions. The productivity of an installation of this type is adversely affected as a result.

U.S. Pat. No. 4,497,609 describes an apparatus by means of which a stream of bulk material can be charged continuously into a shaft furnace. For this purpose, bulk material is charged on the periphery of the shaft furnace via a plurality of chutes.

In view of the prior art, it is an object of the present invention to further develop a process according to the preamble of claim 1 and an apparatus according to the preamble of claim 4 which, compared to the prior art, lead to improved process management and a more economic configuration of the installation.

The object which has been set is achieved, according to the invention, using the process according to the characterizing part of claim 1 and using the apparatus according to the characterizing part of claim 4.

It is a further object of the invention to develop scattering devices in accordance with the preamble of claim 12 or 13 which are simple to use. This object is achieved by corresponding scattering devices according to claim 12 or 13.

The present invention has proven particularly advantageous when used in a melter gasifier, and is documented in most detail in this respect. However, the use of the invention is not restricted to this embodiment, but rather the description of the operations which take place in a melter gasifier represents an explanation given by way of example. The uses of the invention in other metallurgical units, in particular a shaft furnace, form further concrete embodiments of the invention.

A melter gasifier is a unit for producing pig iron or primary steel products, as has long been known in the prior art.

The melter gasifier, as described in the prior art, is used to melt down a substantially prereduced iron ore (DRI), and to generate reduction gas from reduction-gas carriers, preferably lumpy coal.

The coal and the DRI are generally introduced into the melter gasifier via the dome of the latter, and it has proven expedient for the coal to be introduced centrally.

Accordingly, the DRI is introduced into the melter gasifier via one or more eccentrically located openings on the gasifier dome.

According to one embodiment of the process according to the invention for distributing a lumpy bulk material, in particular iron ore which has been at least partially prereduced, is distributed onto an extensive surface, in particular onto a fixed bed, this surface extending within a reactor or vessel used in physical or chemical process technology, in particular in a reactor used in a metallurgical plant to produce pig iron or primary steel products, and the lumpy bulk material being charged via at least one charging apparatus, which has at least two, in particular rotationally symmetrical, chutes, which are preferably arranged at the same distance from the vertical longitudinal axis of the reactor, in which process, furthermore, at least a proportion of the bulk material is distributed in the radial and/or tangential direction—as seen from above—at a scattering device.

According to a further feature of the process according to the invention, the bulk material is distributed at the scattering device at least partially inside the chute.

According to a further feature of the process according to the invention, the scattering areas of adjacent chutes overlap at least partially before the fixed bed is reached.

According to an additional feature of the process according to the invention, the overall scattering pattern of all the chutes as seen from above substantially forms a concentric ring.

The invention is also characterized by an apparatus according to the invention for distributing a lumpy bulk material, in particular iron sponge, from a flow of bulk material onto an extensive surface, in particular onto a fixed bed, this surface extending within a reactor used in physical or chemical process engineering, in particular within a reactor of a metallurgical plant for producing pig iron or primary steel products, preferably in a melter gasifier, and the lumpy bulk material being charged via a charging apparatus which has at least two, preferably rotationally symmetrical, chutes, and the charging apparatus furthermore has at least one additional scattering device for scattering the bulk material, by means of which at least a proportion of the bulk material can be distributed in the radial and/or tangential direction, as seen from above.

The distribution of a bulk material via a plurality of chutes or inclined tubes has long been known in process engineering, in particular in metallurgical technology.

The additional provision of a scattering device causes the bulk material, as it drops out of the chutes onto the surface, to be additionally scattered, or the streams of bulk material formed in this way to be widened.

According to a particularly preferred embodiment of the invention, the widened streams of bulk material overlap one another. This ensures in particular that, even in the event of a chute failing, for example as a result of becoming blocked, the fixed bed receives a substantially uniform feed of bulk material.

To achieve scattering which is as uniform as possible, distribution in the radial and tangential directions—as seen from above—is particularly suitable, although both radial distribution and tangential distribution used individually also lead to the flow of bulk material being widened and to the bulk material being scattered, although to a limited extent.

According to one feature of the invention, the chutes are arranged at the same distance from the longitudinal axis of the reactor.

Particularly preferably, the bulk material is in this case discharged onto the fixed bed at a plurality of points along an imaginary circle or ring, in which case, according to a further preferred embodiment, the individual flows of bulk material assigned to the chutes partially intersect one another. In this way, it is possible to compensate for the failure of one or more chutes during the charging of the fixed bed.

According to one feature of the invention, the scattering device is arranged in a rigid manner.

Particularly at relatively high temperatures, moveable devices, for example in relevant reactors used in metallurgical technology, have proven to be relatively unreliable. It is necessary to take particular protective measures (with regard to temperature, wear), which entail considerable costs.

By contrast, an immobile, i.e. rigid, apparatus is inexpensive and reliable.

According to a further feature of the invention, the scattering device is arranged so as to be moveable, but without a mechanical drive, in particular without any drive. In this case, according to a preferred embodiment of the invention, the scattering device is rigidly secured.

According to one feature of the invention, the scattering device is arranged inside the chute. This ensures that the scattering device is not exposed to the high temperature of the melter gasifier. In particular, in this case the high radiant heat as occurs in a melter gasifier, causing a high load on all the internal fittings, in the gas chamber is to be taken into account. Installing the scattering device in the chute means that the scattering device is effectively protected from these thermal or thermo-mechanical loads and achieves a long service life.

According to a further feature of the invention, the scattering device has a number of projections which are arranged on the inner side of the chute.

The projections cause the material in the chute to be decelerated and, in particular, be charged onto the fixed bed along a circular ring at a predetermined distance from the centre of the gasifier. According to a preferred embodiment, the wear-resistant projections are fitted in the lower part of the chute.

According to a further feature of the invention, the scattering device has a chain, preferably a round-link chain.

The chain represents a simple and inexpensive alternative allowing the material in the chute or inclined tube to be decelerated, and in this way allowing the desired charging along the circular ring to be produced. The chain is in this case made from heat-resistant and wear-resistant material.

According to a further additional feature, the chain, at predetermined intervals, which preferably vary with respect to one another, has a number of scattering elements, for example nodules.

This ensures that particularly uniform scattering is achieved.

The invention is also directed to a scattering device.

According to a particular embodiment, the scattering device has a number of chains, on each of which, in turn, a number of nodules are provided, and adjacent nodules are arranged at intervals which preferably differ from one another.

The scattering device according to the invention causes the bulk material to be decelerated and scattered, and in this way causes the resulting flow of bulk material which strikes the fixed bed to be widened.

A particular embodiment provides a device which is used to guide and scatter the bulk material, this device having a chute, and a number of projections being arranged on the inner side of the chute.

Figure 1A:
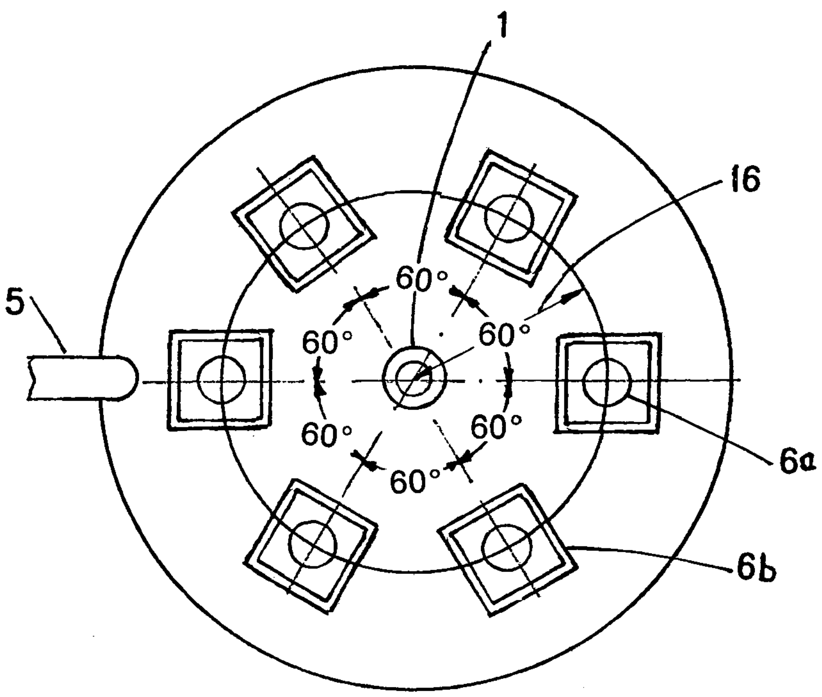
Figure 1B:
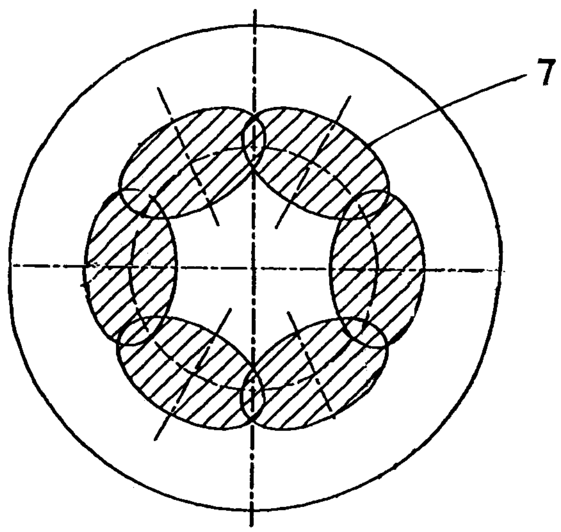
Figure 2:
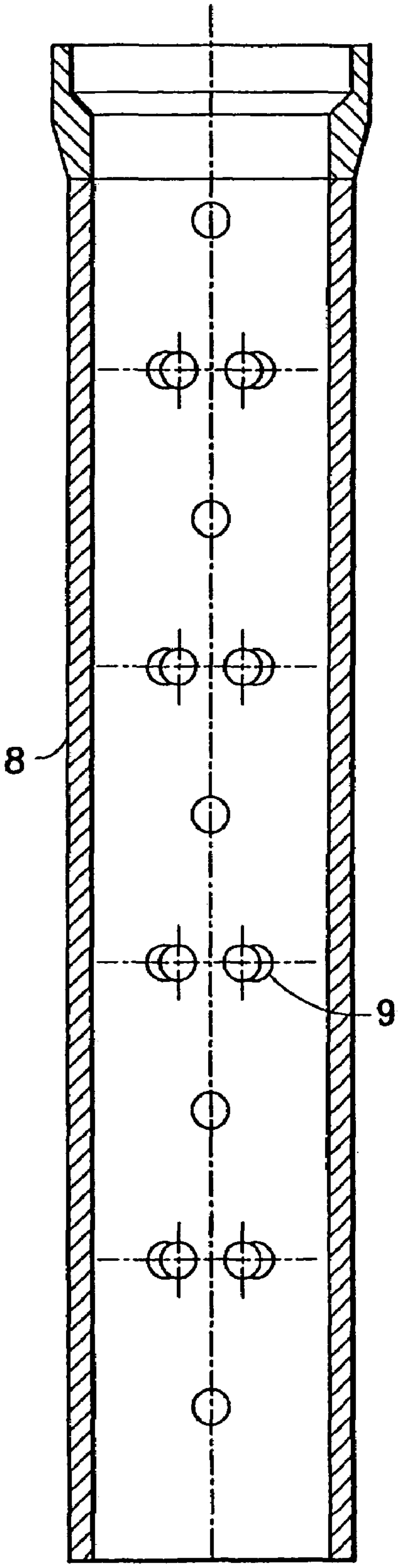
Figures 3, 3A:
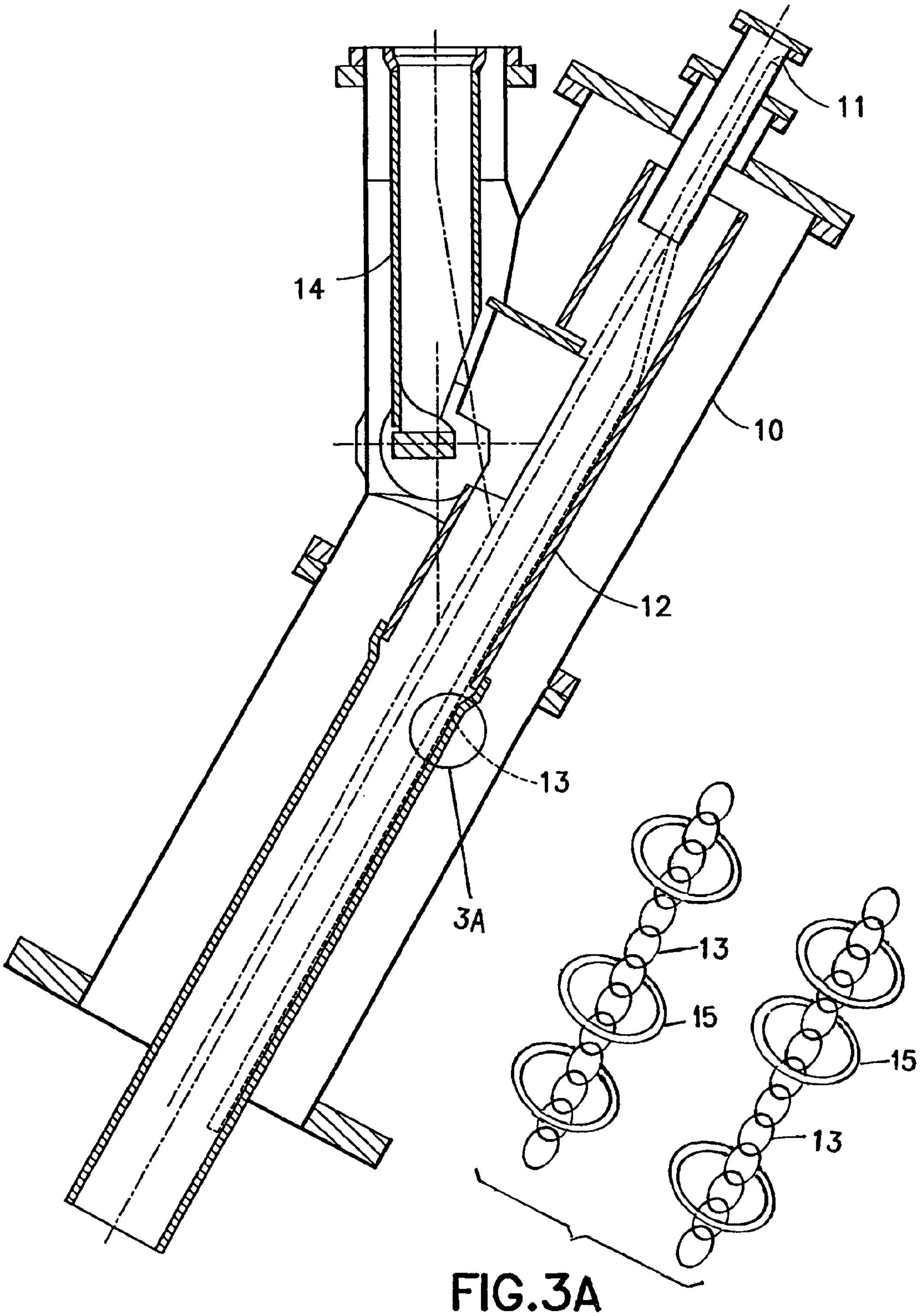

Non-restrictive exemplary embodiments of the invention will be explained in more detail below with reference to diagrammatic drawings, in which:

FIG. 1 diagrammatically depicts the feeds and a discharge line and tap in a melter gasifier, FIG. 1A is a plan view of the melter gasifier, FIG. 1B is a plan view of an exemplary DRI distribution on a fixed bed of the melter gasifier, FIG. 2 shows an exemplary embodiment of a device for combined guidance and scattering, FIG. 3 shows an exemplary embodiment of a scattering device, FIG. 3A is an enlarged view of a portion of FIG. 3 showing chains and nodules on the chains included in the scattering device.

The melter gasifier has feeds for coal 1, for DRI 6, for dust 2, for oxygen 3, as well as a slag and pig iron tap 4 and a gas discharge line 5 for discharging the reduction gas. Both the coal and the DRI are introduced continuously into the melter gasifier. Each feed 6 for the DRI has an opening 6*a* in the gasifier dome, there being six openings at a distance 16 from the coal-introduction means which is oriented along the longitudinal axis, and which are equipped with chutes or inclined downpipes 6*b*. Only partial sections of the chutes or inclined downpipes 6*b* are shown in FIG. 1A in order to clearly show openings 6*a*. For the sake of clarity, in FIG. 1 two feeds 6 for DRI are illustrated and are intended to represent all the feeds 6 for DRI.

The DRI is passed through 6 chutes, which are each secured to the gasifier dome in the corresponding opening, each chute having, on its inner surface, projections which are used to scatter the DRI.

The DRI is distributed along an imaginary circle or ring onto the bed of the melter gasifier, without any DRI being charged into the centre. The distribution of the DRI is diagrammatically illustrated in FIG. 1B, in which the DRI distribution 7 on the fixed bed is diagrammatically sketched. Accordingly, the scattering of the DRI in the chutes, compared to the prior art, results in an increase in the scattering radius of the DRI on the fixed bed, with the individual scattering areas partially overlapping one another. The scattering according to the invention leads to uniform distribution and, in particular, improved mixing of the DRI with the coal which is introduced.

FIG. 2 diagrammatically depicts a device according to the invention for guiding and scattering the DRI. This device is a chute 8, on the inner surface of which a plurality of projections 9 are arranged. If the DRI is passed through this chute, it is diverted and decelerated by the projections.

All parts of the apparatus presented here have to be adapted to the prevailing conditions in their particular area of use. When used in a melter gasifier, materials which withstand high temperatures and are wear-resistant are predominantly used. Furthermore, consideration may be given to providing those parts which are exposed to particularly high temperatures with a refractory lining.

Those parts of the apparatus illustrated here which experience has shown are exposed to particularly high levels of wear are additionally protected by reinforcements, for example by welded-on plates.

FIG. 3 shows an embodiment of a scattering device as is used, for example, in a melter gasifier for introducing the DRI onto the fixed bed. In this case, one or more chains 13 are arranged in a chute 10 by suitable securing means 11 in a protective pipe 12.

According to a preferred embodiment, the chains have a plurality of nodules 15 as shown in FIG. 3A. In this case, the distances between the nodules preferably vary. The bulk material which is introduced into the chute 10 via a feed line 14 is decelerated and scattered by the chains and/or the nodules of the chains.

The invention claimed is:

1. A process for distributing a lumpy bulk material onto an extensive surface, wherein the surface extends within a reactor or vessel used in physical or chemical processing, and the vessel having a vertical longitudinal axis; the process comprising:

charging the lumpy material into the vessel via respective chutes at at least two locations of the vessel and the locations being spaced at a distance from the vertical longitudinal axis of the reactor and above the surface, and after the material has been introduced into the chutes and before the material contacts the extensive surface in the vessel, scattering at least a portion of the lumpy bulk material entering via at least one of the chutes for increased scattered distribution of the lumpy material over the surface, the scattering being in at least one of the radial and tangential directions with respect to the surface in the vessel for increasing the cross-sectional area of flow of the lumpy material traveling through each one of the at least one of the chutes, wherein the cross-sectional area of flow is measured perpendicularly to the direction of flow of the lumpy material, and selecting the locations of charging of the bulk material into the vessel so that the scattering process is of sufficient extent that scatter areas on the surface formed by adjacent locations of charging of lumpy material cause partial overlap of the scatter areas of adjacent areas of charging even before the lumpy material reaches the surface in the vessel.

2. The process of claim 1, wherein the charging locations are rotationally symmetrical locations around the longitudinal axis of the vessel.

3. The process of claim 2, wherein the charging locations into the vessel are all at the same distance from the vertical longitudinal axis of the vessel.

4. The process of claim 3, wherein the charging locations of the lumpy material in the vessel and the scattering process are respectively so designed and selected that an overall scatter pattern of lumpy material generated through all of the charging locations produces substantially a concentric ring on the surface.

5. The process of claim 2, further comprising introducing coal into the vessel along the central longitudinal axis.

6. The process of claim 1, wherein the scattering is done at the chute.

7. The process of claim 1, wherein the lumpy bulk material used in the process comprises iron ore which has been at least partially prereduced and wherein the reactor or vessel is a reactor used in a metallurgical plant to produce pig iron or primary steel products.

8. Apparatus for distributing a flow of lumpy bulk material onto an extensive surface in a reactor vessel, wherein the vessel has the surface therein on which the material is to be distributed, the apparatus comprising:

a charging apparatus for the vessel comprising a plurality of chutes fixed in place relative to the vessel for charging lumpy bulk material into the vessel, the chutes being at locations relative to the vessel such that the lumpy material is distributed over the surface;

a scattering device operatively associated with one of the chutes for scattering the bulk material entering the vessel through the chute for increasing the distribution of at least a portion of the lumpy material in at least one of the radial and tangential directions of the surface in the vessel, the scattering device being operable to increase the cross-sectional area of flow of the lumpy material traveling through the chute, wherein the cross-sectional area of flow is measured perpendicularly to the direction of flow of the lumpy material, and wherein the scattering device is moveable in the chute.

9. The apparatus of claim 8, wherein the vessel has a vertical longitudinal axis and the chutes are arranged in a rotationally symmetrical manner around the longitudinal axis of the vessel.

10. The apparatus of claim 9, wherein the chutes are at the same distance from the vertical longitudinal axis of the vessel.

11. The apparatus of claim 8, wherein the scattering device for one of the chutes is arranged in the chute.

12. The apparatus of claim 8, wherein the scattering device comprises a chain in the chute.

13. The apparatus of claim 12, further including a plurality of scattering elements at intervals along the chain.

14. The apparatus of claim 13, wherein the scattering elements comprise nodules on the chain.

15. The apparatus of claim 13, wherein the scattering elements are spaced at varying intervals along the chain.

* * * * *